United States Patent [19]

Pleyber et al.

[11] Patent Number: 5,047,642
[45] Date of Patent: Sep. 10, 1991

[54] RADIOLUMINESCENT SCREEN WITH AN IMPROVED QUALITY FACTOR AND SPATIAL RESOLUTION FOR X OR GAMMA PHOTON IMAGING

[75] Inventors: Gaëtan Pleyber, Domene; Philippe Gerard, Saint Ismier, both of France

[73] Assignee: Commissariat a l'Energie Atomique, Paris, France

[21] Appl. No.: 595,955

[22] Filed: Oct. 11, 1990

[30] Foreign Application Priority Data

Oct. 12, 1989 [FR] France .............................. 89 13352

[51] Int. Cl.$^5$ ............................................ G01T 1/202
[52] U.S. Cl. .................................. 250/368; 250/487.1
[58] Field of Search ................... 250/368, 367, 487.1, 250/486.1

[56] References Cited

U.S. PATENT DOCUMENTS 3,930,160 12/1975 Swinehart .
4,236,077 11/1980 Sonoda et al. .................. 250/486.1

FOREIGN PATENT DOCUMENTS 2204769 5/1986 United Kingdom .
2167279 11/1988 United Kingdom .

Primary Examiner—Jack I. Berman
Assistant Examiner—Richard Hanig
Attorney, Agent, or Firm—Pearne, Gordon, McCoy & Granger

[57] ABSTRACT

Radioluminescent screen with an improved quality factor and spatial resolution for X or gamma photon imaging having a transparent plate (2) made from a scintillating material cooperating with an image sensor (16) transforming the light photons produced in the scintillating plate (2) by X or gamma photons into currents supplying a video system, characterized in that the scintillating plate (2) has in its volume light deflecting lines (4) distributed in a direction perpendicular to the plane of the plate, in accordance with spacings equal to or smaller than those of the image points of the said plate.

7 Claims, 2 Drawing Sheets

RADIOLUMINESCENT SCREEN WITH AN IMPROVED QUALITY FACTOR AND SPATIAL RESOLUTION FOR X OR GAMMA PHOTON IMAGING

The present invention applies to the field of X or gamma photon imaging using a radioluminescent screen which, in conventional manner, comprises a scintillating material transparent plate for transforming the X or gamma photons into photons in the visible range, in conjunction with an image sensor receiving said photon of the visible spectrum and transforming them into electric currents supplying a video observation system.

It more particularly applies to the instantaneous display, with a high spatial resolution, of X-ray images formed from a plurality of scintillations which appear simultaneously and whereof measurement takes place of the sum of the light fluxes emitted during the exposure time devoted to the examination of a given area of the examined body.

The technical problem solved by the invention is the obtaining of a high spatial resolution image whilst using in a hitherto a priori incompatible manner, a thick scintillator screen ensuring a high information quantity and therefore a good figure of merit.

Figure 1:
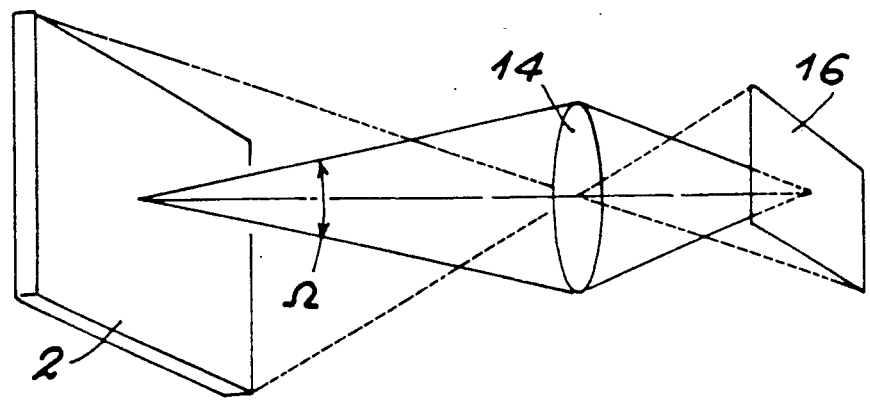
Figure 2:
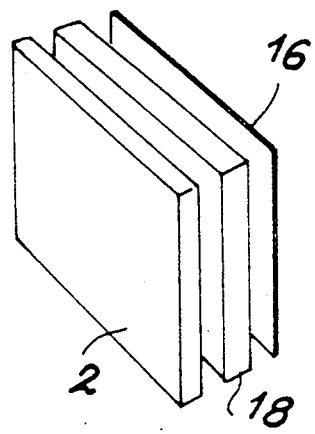

In known manner, different arrangements of such radioluminescent screens are used and in particular those having an optical device for retaking light photons produced by the scintillator in order to then supply them to an image sensor, e.g. of the charge transfer type (FIG. 1) and those in which the image sensor and the scintillator are associated in a coplanar structure and separated from one another by an optical guide (FIG. 2).

FIG. 1 diagrammatically shows a known device having a scintillator 2, an optical retaking lens 14 for the light photons emitted by the scintillator 2 in the solid angle $\Omega$ and an image sensor 16 e.g. constituted by a charge transfer camera.

FIG. 2 diagrammatically shows another known device having in a coplanar structure a scintillator and an image sensor 16 separated by a planar optical guide 18 for transmitting scintillation photons to the sensor 16. In this device, the solid light photon retaking angle is $2\pi$.

The lines left by the X or gamma photons in the transparent scintillating material plate constituting what can be called a latent image and the different scintillations emitted by the scintillator medium constitute a plurality of elementary light sources isotropically emitting throughout the transparent plate and thus materializing in three dimensions in its entire volume the impact points of the X or gamma rays with the scintillating material. In order to exploit this three-dimensional latent image, it must be transformed into a two-dimensional image as an orthogonal projection of said latent image onto the output surface of the light rays of the scintillator.

A first reason for a reduction or loss of the light information collected by the image sensor is that all the light rays from the different scintillations do not pass out to the outside of the scintillator, because a non-negligible part thereof is trapped by total reflections in said plate and they only pass out of the latter in a weakened state or via the lateral edges.

A second reason for a loss of information is the difficulty of ensuring that the maximum number of scintillating light beams are optically taken up again by the system responsible for transferring them from the scintillating plate to the image sensor. This takes place in a solid angle $\Omega$, whose axis is perpendicular to the screen axis (cf. FIG. 1).

In a conventional manner, the quality of the image read by the image sensor and retransmitted to the video system is described with reference to two characteristic quantities constituted on the one hand by the figure of merit defined as the ratio between the number of visible light photons recovered by the image sensor and the associated number of X or gamma photons during the creation of the latent image and on the other hand the spatial resolution of the radioluminescent screen characterizing the accuracy and fineness of the picture supplied and which in an initial approximation can be defined as the mid-height width of the spreading function on the output surface of each light line corresponding to a scintillation point.

Unfortunately hitherto there has been incompatibility between the improvement of these two features and the prior art radioluminescent screens result from a compromise between them because, in order to have a good figure of merit, it is necessary to increase the screen thickness to increase the light emitted, but the thicker the screen the less satisfactory the spatial resolution.

Moreover, a good figure of merit also requires a good optical coupling between the scintillator and the camera (independently of the resolution) and is linked with the physical constitution of the screen, which is also independent of the spatial resolution.

The technical problem solved by the present invention is the optimization of the two previously defined quantities and which together contribute to the quality of the image obtained by such a device.

Another important technical problem solved by the invention to a significant extent is that resulting from the possible compatibility deficiency between the matrix structure of the scintillator and the matrix structure of the image sensor when these two components effectively have such a structure. Thus, the matrix structure of the scintillator systematically interferes with that of the image sensor, such as e.g. a charge transfer camera. However, it is very advantageous in ordinary radiography and virtually imperative in tomography to acquire images with a good geometrical stability. Thus, in the prior art for these applications use is made of semiconductor-based image sensors, like charge transfer sensors, which have a matrix structure, but which are associated with scintillators having a non-matrix structure.

Moreover, when use is made of scintillators with an association of optical fibres forming a regular beam in order to obtain a good optical coupling, this limits the choice of the image sensor to those of the vidicon tube type, whereof the retina has a continuous structure, i.e. of a type opposite to that of matrix structure image sensors, for the purpose of retaining the image sampling fineness corresponding to the network of optical fibres of the scintillator.

In order to then make possible the association of the two matrix structures, it is either necessary to have a perfect coincidence of the spacings of the two sampling matrixes present, which is very difficult and limits the use conditions of the system, because it is necessary to associate with each magnification of the image desired a precise matrix structure of the scintillator, or use a regular matrix structure scintillator with a smaller sampling spacing than that of the matrix image sensor used, or structure the scintillator in non-matrix manner by creating a pseudo-continuous sampling system not interfering with the sampling of the matrix image sensor.

Thus, the transfer of the volume latent image to the output surface of the scintillator, which is necessary for improving the spatial resolution factor, becomes all the more necessary as the scintillator plate thickness increases, particularly related to the depth of field of the reading optics of the image sensor.

The invention therefore relates to a radioluminescent screen for X or gamma photon imaging, whose quality factor and spatial resolution are improved by facilitating on the one hand the transmission of the volume latent image to the output face of the scintillator and also by assisting on the other hand the emergence of the light from the plate and the trapping of the light by the image sensor coming from the preceding projection of the scintillations onto the output surface of the scintillator.

The radioluminescent screen according to the invention has a scintillating material transparent plate cooperating with an image sensor transforming the light photons produced in the scintillating plate by X or gamma photons into current supplying a video system, characterized in that, in its volume, the scintillating plate has light deflecting lines distributed in a direction perpendicular to the plane of the plate, with spacings equal to or smaller than those of the image points brought to the format of said plate.

The term light deflecting line is understood to mean in general terms a thin cylindrical range, with a general direction perpendicular to the output face of the scintillator and within which the optical properties thereof are modified in such a way that any light beam encountering it is deflected either by diffusion, or by reflection. As each line has a direction perpendicular to the surface of the scintillating plate, the light beams encountering it and which it deflects have a greater probability of reaching the surface rapidly and at a point close to the orthogonal projection on the surface of the scintillator of the source point of the scintillation in question.

According to the invention, the light deflecting lines are arranged either in accordance with a regular matrix network with a spacing equal to or smaller than that of the image points of the video system brought homothetically to the dimensions of the plate, or in a random manner in the scintillating mass with average spacings equal to or smaller than those of the image points of the plate.

The problems caused by the matrix structures of the scintillator and the sensor are independent of the quality factor. However, the spatial resolution can be limited by the interference of the two sampling structures of the image (i.e. the structure of the plate and that of the sensor). In addition, as a function of the matrix or non-matrix sensor used, the choice of the distribution of the deflecting lines is not of a random nature. In other words, for a non-matrix sensor, the deflecting lines can be distributed in a random or matrix manner with in both cases average spacings defining the size of the image point brought to the plate and therefore the spatial resolution of the image. For a matrix sensor, the deflecting lines can be distributed in a random or matrix manner with in both cases average spacings at the most equal to half the spacings of the image point (or sampling spacing) brought to the format of the plate, in order to avoid the appearance of errors in the image. More specifically for a given matrix sensor, the distribution of the deflecting lines in the matrix must preferably be in accordance with spacings well below half the sampling spacings of the image in order to render imperceptible moiré in the image. In the case of a random distribution, moiré does not exist and the spacings can be larger than those of the matrix structure. Thus, the interest of using a random distribution is clear.

The random distribution of numerous deflecting lines consequently has the effect of favouring the impact on the surface of a beam at a point close to the projection of the source point onto said same surface of the scintillator without giving to the projection of the latent image onto the output surface thereof a matrix structure. In other words, the presence of deflecting lines on the path of the light beams within the scintillating mass has the effect of bringing about the projection of a large part of the latent volume image onto the output surface of the scintillator in the form of a two-dimensional image without a matrix structure. The use of deflecting lines distributed in a matrix or random manner improves the overall quality of the radioluminescent screen by permitting a better detection by the image sensor of the latent image obtained by scintillation, whilst preserving a good spatial resolution.

According to the invention, the optical deflecting lines of the light are constituted by defects of a physical and/or chemical nature induced by any known means in the scintillating mass, such as e.g. ion implantation or bombardment.

According to other embodiments, the deflecting lines are produced with the aid of parallel, cylindrical holes made in the scintillating material.

Another complimentary feature of the radioluminescent screen according to the invention and which serves to optimize the optical coupling between the scintillating mass and the image sensor consists of the output surface of the scintillating plate being provided with reliefs formed e.g. by a series of integrated lens, which focus the light into the retaking angle of the image sensor.

In another embodiment, the conditioning of the output surface for optimizing the optical coupling consists of interposing thereon a fluorescent screen, which is sufficiently thin to ensure that the total reflection phenomenon does not occur there. Said thin fluorescent layer can also be used for adapting the wavelength of the light emitted to the reception possibilities of the image sensor, in order to also improve the optical coupling.

Figure 5:
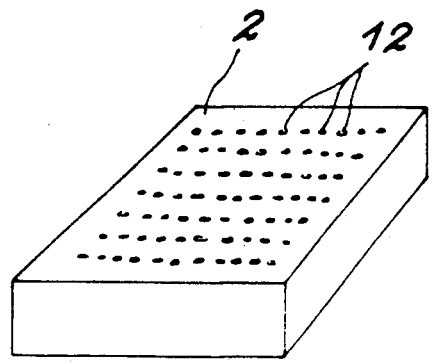

The Applicant is aware of GB-A-2 204 769 relating to a radiation detector and having a scintillating plate, whose mass contains slots in the form of grooves for guiding therein the light photons of the different scintillations caused by high energy X or gamma radiation. However, these slots located at two superimposed levels (FIGS. 5, 6, 8 and 9) serve to define geographical observation fields, as explained in FIGS. 5 and 6, in which the gamma or X rays are detected separately and one by one in time and in space, on the basis of the arrival of light scintillations classified according to their intensity. Such a process only permits spectroscopic imaging and requires a subsequent processing by computer of the data acquired in order to construct the image on the basis of information collected on each scintillation.

In addition, due to the fact that the slots are produced mechanically by ablation of the scintillator material, the grooves cannot be wider than a few microns for a depth at the most equal to five times said width, whereas the light deflecting lines according to the present invention can have a diameter of a few hundred Angstroms ($10^{-8}$ meter) with a length to diameter ratio of approximately 500. This is fundamental when it is wished to instantaneously display with a high spatial resolution, radiological images formed by a plurality of scintillations, which appear simultaneously and whereof measurement takes place of the sum of the light fluxes emitted during the exposure time devoted to the examination of a given area of the body in question.

Finally, the structure recommended in said patent does not make it possible to obtain in the manner of the present invention, an immediate two-dimensional projection towards the surface of the scintillating plate of the three-dimensional latent image such that it appears therein with such a good quality factor for a high spatial resolution, which can be less than 1 micron.

Figure 3:
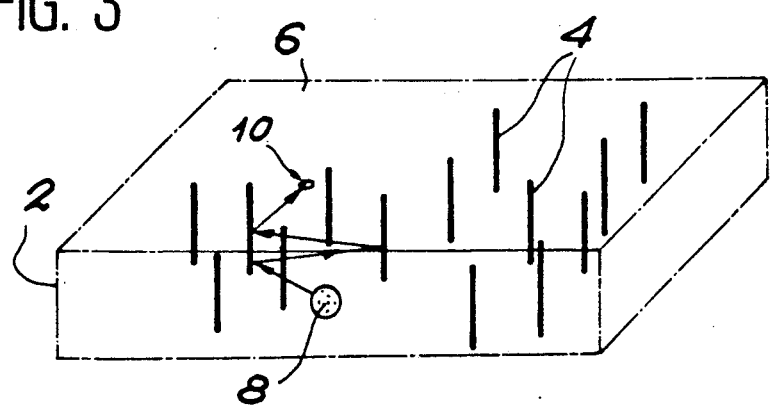

The invention is described in greater detail hereinafter relative to non-limitative embodiments and with reference to the attached FIGS. 3 to 6, wherein show:

FIG. 3 A scintillating material plate provided with deflecting lines for light distributed within said plate.

Figure 4:
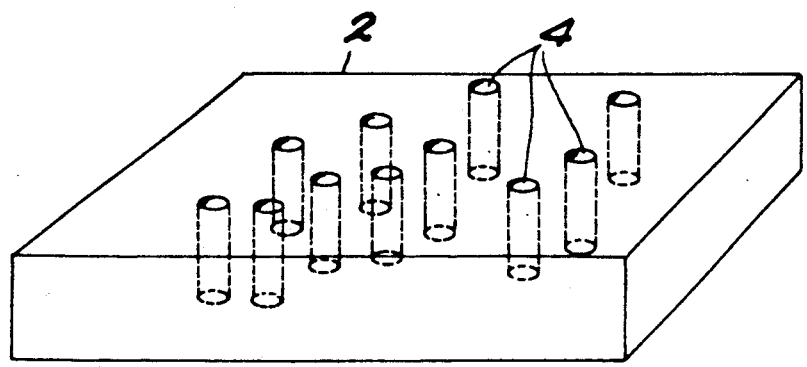

FIG. 4 A scintillating plate having deflecting lines produced as a result of very high energy ion bombardments and with a random distribution.

FIG. 5a A scintillating plate covered with small randomly juxtaposed, hemispherical lenses.

FIG. 5b In section the action on the emergent light of said optical coating.

Figure 6:
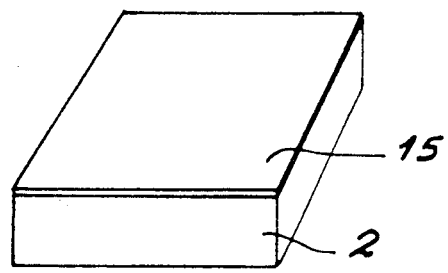
Figure 5:
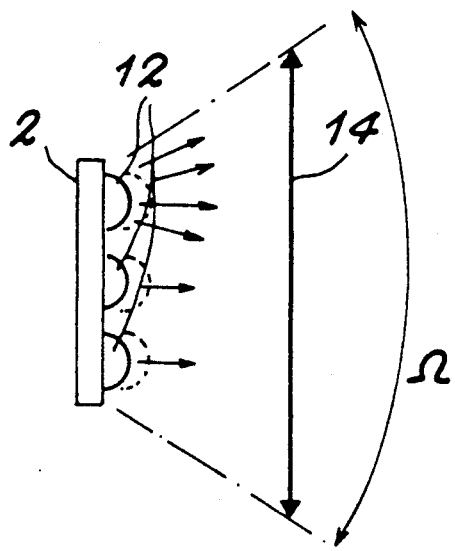

FIG. 6 In perspective a thin fluorescent layer associated with the scintillator.

FIG. 3 shows a scintillating material plate 2 transparent to its own emission and having, according to the invention, a certain number of light deflecting lines such as 4 constituted by small, thin, juxtaposed cylinders in the scintillating mass 2 perpendicular to the output surface 6 of said same mass and of length equal to the useful thickness of the mass, so as to create an optical discontinuity thereof. FIG. 3 diagrammatically shows a scintillation 8 with light photons, whose path indicated by arrows is reflected or diffused on a certain number of deflecting lines 4 in order to finally emerge at 10 on the output surface 6 of the scintillating plate. As stated hereinbefore, the deflecting lines 4 distributed in this way in the scintillating plate 2 make it possible to transform the volume latent image of the photons 8 into an output image constituted by light sources 10 emitting photons on the output surface 6 of the scintillating plate 2. This consequently permits a better acquisition of the light image by the not shown image sensor, but which is positioned in known manner facing the scintillator 2. According to the invention, one of the effects of the light deflecting lines 4 is to obtain an emergence of the photons having scintillated at point 8 in the vicinity of the orthogonal projection 10 of said point onto the output surface 6 of the scintillator 2.

According to the invention, when it is wished to produce deflecting lines 4 having submicron diameters, the simplest way to obtain them consists of bombarding the mass of the scintillator 2 with heavy ions.

As a non-limitative example, such light deflecting lines were obtained in Tb-doped $Gd_3Ga_5O_{12}$ garnets (GGG) by bombarding said scintillators over a thickness of about 50 microns corresponding to the useful thickness of the scintillator using xenon ions with an energy of 5 MeV per nucleon. This leads to a transformation of the scintillator material which, on the path of the bombardment, becomes amorphous and is consequently able to modify the paths of a light beam.

In other constructions, use is then made of orthophosphoric acid at a temperature of approximately 50° to 100° C. for attacking in preferred manner the areas which have previously been rendered amorphous and in this way form holes with a diameter of approximately 1000 Å and which are statistically well distributed.

The choice of the irradiation energy of the heavy ions and the dose makes it possible to precisely adapt the irradiation conditions to the sought length for the holes. The irradiation of the scintillator mass in the beam of a particle accelerator leads to a random distribution of the light deflecting lines in the scintillating mass with a hole size dependent on the breaking or deceleration conditions of the ions in the material and the subsequent chemical etching conditions.

In the particular case where use is made of an image sensor functioning in matrix manner, it is necessary to avoid in preferred manner for the reasons given hereinbefore in the transformation consisting of projecting the latent volume image onto the plane of the output face, giving said transfer image an intermediate matrix structure. Thus, it can be of interest in this case, even with millimetre imaging, to carry out a random implantation in the scintillating mass with conventional drilling means and producing by digital control an adequate pseudo-random structure. A supplementary arrangement can be sought for both a random and matrix structure plate by replacing these cylinders by a light diffusing or reflecting material.

In the special case of liquid scintillators, the light deflecting lines according to the invention can e.g. be reflecting or diffusing wires positioned perpendicular to the detection plane.

FIG. 4 shows an implantation with random distribution of a certain number of deflecting lines 4 in a scintillating plate 2, said deflecting lines being produced from very high energy ion bombardments leading to approximately diameter 1000 Å, length 50 micron deflecting lines.

With reference to FIGS. 5a and 5b a description will now be given in exemplified manner of the conditioning of the output surface of the scintillator for reducing the amount of the total reflection and for orienting the light from the scintillation in the solid angle $\Omega$ for the retaking of the optical information by the image sensor.

For this purpose use is made of a modification of the initially planar relief of the scintillating mass 2 by placing there a plurality of small, juxtaposed, convergent lenses 12 e.g. constituted by hemispherical balls placed on the surface (FIG. 5a). FIG. 5b shows how the light leaving plate 2 through the microlenses 12 is reflected in the solid angle $\Omega$ of reading the light information by the input face 14 of the image retaking optics. The lenses 12 can be produced by direct microlithography on the scintillating plate 2.

According to the invention, it can also be useful to condition the output surface of the scintillator 2, so as to adapt the visible light wavelength leaving the scintillator to the response of the image sensor. In this case, as shown in FIG. 6, it is possible to form on the surface of the scintillating plate 2 a very thin film 15 emitting its own light by fluorescence under the effect of scintillation light beams brought to the surface by the deflecting lines according to the invention.

This surface film has a thickness such that the total reflection phenomenon cannot occur there and is typically below 300 Å for visible wavelengths. In this film, no matrix structure appears and there is no risk of moiré with a charge transfer sensor.

In order to obtain the aforementioned fluorescent layer, two main means can be used within the scope of the invention, namely the production thereof by the epitaxial growth of a fluorescent crystal, e.g. Tb-doped GGG on the plate, or the production of said fluorescent layer by implanting doping ions of the Tb type directly on the initial substrate. In this hypothesis, it can sometimes be necessary to make the scintillator undergo an adequate heat treatment to enable it to again acquire its scintillating properties which would have been destroyed on the surface during an excessively high energy implantation irradiation.

We claim:

1. Radioluminescent screen with an improved quality factor and spatial resolution for X or gamma photon imaging having a transparent plate (2) made from a scintillating material cooperating with an image sensor (16) transforming the light photons produced in the scintillating plate (2) by X or gamma photons into currents supplying a video system, characterized in that the scintillating plate (2) has in its volume light deflecting lines (4) distributed in a direction perpendicular to the plane of the plate, in accordance with spacings equal to or smaller than those of the image points brought to the format of said plate.

2. Radioluminescent screen according to claim 1, characterized in that the light deflecting lines (4) are constituted by defects of a physical and/or chemical nature induced in the scintillating material.

3. Radioluminescent screen according to claim 1, characterized in that these light deflecting lines (4) are constituted by holes made in the scintillating material.

4. Radioluminescent screen according to any one of the claims 1 to 3, characterized in that the deflecting lines (4) are implanted in accordance with a regular matrix network in the scintillating material (2).

5. Radioluminescent screen according to any one of the claims 1 to 3, characterized in that the deflecting lines (4) are implanted in random manner in the scintillating material (2).

6. Radioluminescent screen according to any one of the claims 1 to 5 for improved optical coupling with the image sensor (16), characterized in that the output surface (6) of the scintillating plate (2) has reliefs in the manner of integrated lenses (12).

7. Radioluminescent screen according to any one of the claims 1 to 5 for improved optical coupling with the image sensor (16), characterized in that the output surface (6) of the scintillating plate (2) has reliefs such as in the form of a fluorescent film.

* * * * *